Patented May 25, 1937

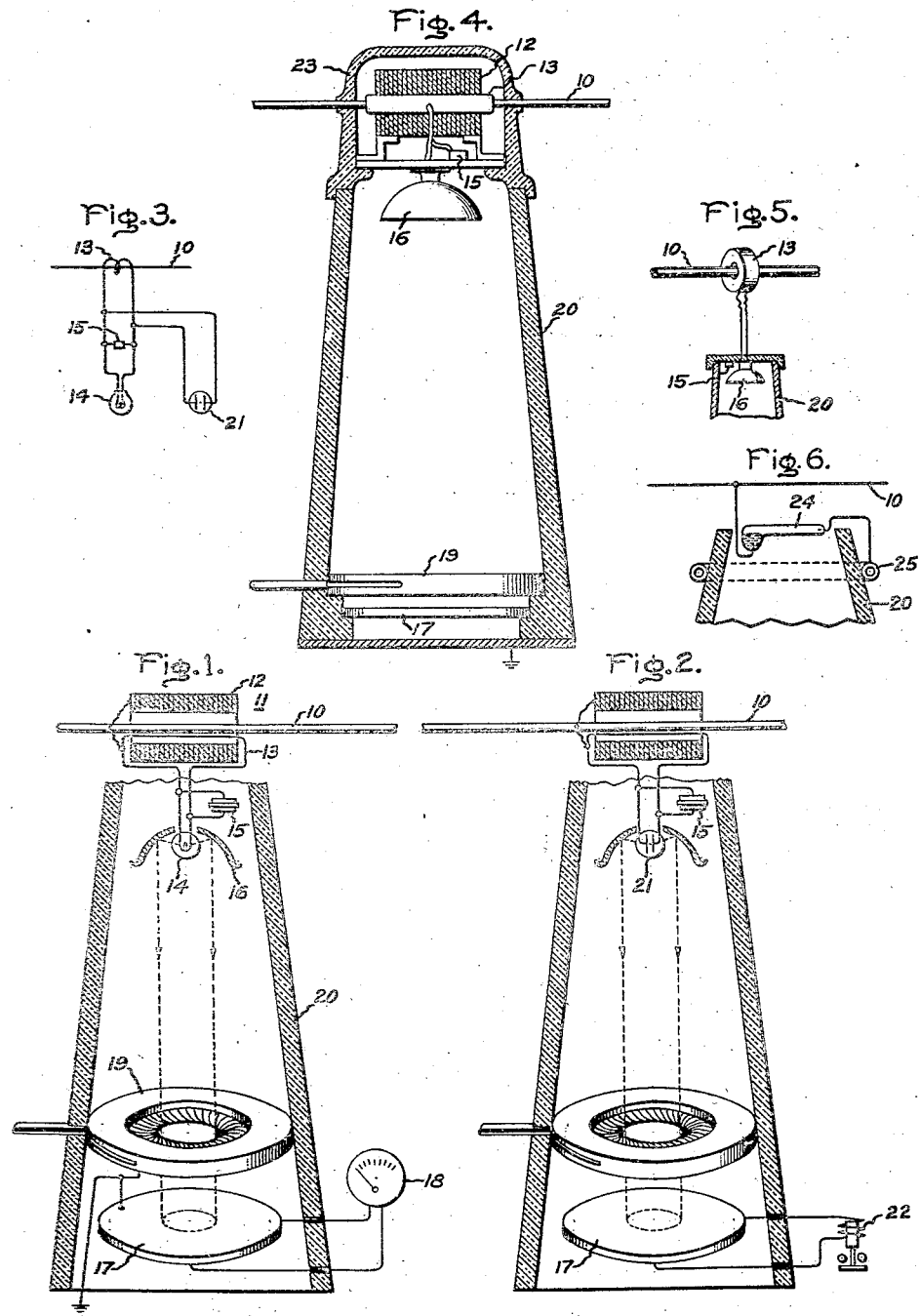

2,081,839

UNITED STATES PATENT OFFICE 2,081,839

HIGH-VOLTAGE CURRENT-RESPONSIVE APPARATUS

William K. Rankin, Lansdowne, Pa., assignor to General Electric Company, a corporation of New York Application November 13, 1935, Serial No. 49,505

5 Claims. (Cl. 171—95)

Instrument transformers insulated for high voltages are generally employed where it is desired to obtain a measurement or control current proportional to the voltage or current of a high-tension alternating-current circuit. Such transformers are expensive primarily because of the elaborate character of the insulation necessary to insulate the primary and secondary circuits. My invention relates to a method and apparatus for accomplishing this kind of measurement at less expense.

In carrying my invention into effect, I may employ an ordinary inexpensive low-voltage current transformer or capacitance coupling associated directly with the high-tension circuit and supply radiant energy means, such as an incandescent lamp, from its secondary winding. The radiant energy is then transmitted through an air space which serves as an insulator to radiant energy responsive means, such as a light-sensitive cell, to produce a flow of low-voltage current proportional or in response to the desired characteristic of the high tension circuit. The elaborate insulation features usually required in high-voltage current measurement installations are thus made unnecessary, resulting in a corresponding decrease in the cost of the installation.

The features of my invention which are believed to be novel and patentable will be pointed out in the claims appended hereto. For a better understanding of my invention, reference is made in the following description to the accompanying drawing, in which Fig. 1 represents the circuit connections and radiant energy transmitting principle of my invention for obtaining low-voltage measurement current; Fig. 2 is similar to Fig. 1 except as modified to obtain a low-voltage trigger action relay current responsive to the current flowing in a high-tension conductor; Fig. 3 illustrates that both types of apparatus of Figs. 1 and 2 may be energized from the same current transformer; Fig. 4 shows an enclosing and supporting structure in cross section for such apparatus; Fig. 5 represents the current transformer supported by the primary conductor independently of the remainder of the apparatus; and Fig. 6 represents a capacitance coupling that may be used for voltage response.

Referring to the drawing in which like parts are designated by like reference characters, and particularly to Fig. 1, 10 represents a high-tension or high-voltage current conductor assumed to have alternating current flowing therein and it is further assumed that it is desired to obtain low-voltage measurement currents proportional to the current in conductor 10. The apparatus includes a low-voltage current transformer 11 having a core 12, a primary winding consisting of the conductor 10 and a secondary winding 13. The relative number of turns in primary and secondary will of course be chosen to obtain the transformation radio desired, depending on the magnitude of current flow in conductor 10 to be measured. The secondary winding 13 and primary winding 10 are preferably connected to the core 11 to prevent corona discharges in the transformer. The only insulation required in the transformer is that sufficient to insulate the winding turns where a voltage of the order of 110 is expected across the terminals of the secondary winding.

The secondary terminals of the transformer are connected to energize a radiant energy producing device which, in this case, is an incandescent lamp 14. In parallel with the lamp, there is connected an impedance 15 having such characteristics with respect to that of the lamp as will cause the effective radiant energy given off by the lamp to be directly proportional to the current flowing in conductor 10 over a considerable range including the desired measurement range. The impedance 15 may be a resistor of the carborundum class having a resistance which decreases as the voltage applied thereto increases. It serves not only as a bypass protector for the lamp but also to modify the voltage on the lamp so that its illumination over an extended range is directly proportional to the primary current in conductor 10. The transformer is preferably designed to become saturated at or near the full load primary current in line 10 when the lamp has reached maximum brightness consistent with safety so that, under ordinary circumstances, the voltage on the lamp is not excessive and it, therefore, has a reasonably long life.

The light rays from the lamp are directed through space by a suitable reflector 16 to a light-sensitive cell 17, such as the copper film type, which generates a direct-current voltage when exposed to light which is proportional to the light intensity. The cell is connected to supply a low-voltage measuring circuit in which is included a sensitive direct-current ammeter 18 or such other current-responsive devices as it is desired to operate. Between the light source 14 and cell 17, there is preferably provided an adjustable color screen or light orifice, such as an iris diaphragm 19, by means of which the measuring device, such as the ammeter 18, may be more readily calibrated and adjustments made for changes in the number or character of the measuring instruments which constitute the load burden supplied by the cell 17. External light rays are shut out preferably by an elongated opaque insulating enclosure 20 which may be used also to support the apparatus and exclude dust and moisture, as more clearly indicated in Fig. 4. While the low-voltage circuit including the cell 17 and ammeter 18 is thus adequately insulated from the high-tension line 10 and the parts directly associated therewith, the insulating tube 20 is relatively inexpensive as compared to the cost of the insulation required between the primary and secondary of the usual high-voltage current transformer.

The tube 20 will be of sufficient length to make the gap or spacing between the parts exposed to the high potential and the parts associated with the low-voltage measuring circuit in excess of the discharge space corresponding to such high potential. The iris diaphragm and cell 17 are preferably grounded as indicated.

The apparatus is designed and calibrated to produce a measurement indication on ammeter 18 of the line current in conductor 10 over the range desired. It is apparent that, with the apparatus thus arranged, the low-voltage measuring circuit operates at ground potential and is adequately insulated and protected from the high voltage existing on line 10. The radiant energy rays which are produced in response to the current in the conductors 10 and 13 in the immediate vicinity of the high potential existing thereon are thus transmitted through space away from the high potential conductors to a point beyond the space breakdown range of such high potential, and a direct current is then produced at the point of safety in a low-voltage grounded circuit.

Where a trigger action responsive to the high-tension line current is desired, the filament type lamp 14 of Fig. 1 may be replaced by a gas discharge lamp 21 having spaced electrodes as shown in Fig. 2. In this modification, the space between the plates of lamp 21 breaks down when the voltage thereacross reaches a predetermined selected value. A relay 22 is connected in the circuit of the light-sensitive cell 17. It will, of course, be understood that a relay may be operated from the apparatus of Fig. 1 but the relay action will then be delayed slightly due to the time lag in heating the filament of lamp 14 upon a sudden rise in current and, where a substantially instantaneous relay action is desired, as for the opening of an overload circuit breaker in line 10, the trigger action obtained by the type of lamp used in Fig. 2 is to be preferred. In Fig. 2, there is no time lag in the lamp. It discharges as soon as the primary line current reaches a predetermined value. The resulting light flash is transmitted to the light sensitive cell 17 and the relay 22 is operated very quickly in response to the primary current surge that caused the operation. In Fig. 2, the resistor 15 serves as a bypass for the secondary currents of the transformer which are below the value for which the lamp 21 is designed to break down and prevents the voltage across the lamp terminals from rising to the breakdown point when no relay action is called for.

The two types of lamp of Figs. 1 and 2 may be energized from the same current transformer, as indicated in Fig. 3, as it will be evident that the gas discharge lamp 21 draws no current and does not affect the calibration of lamp 14 until the lamp 21 discharges. If the lamp 21 is used to operate an overload relay, it functions only when the current rises beyond the ordinary measurement range over which the lamp 17 is used. In this case, the gas discharge lamp serves as an added bypass protective device for the filament lamp.

The insulating opaque tube 20 may be made sufficiently strong to support the current transformer 11 and conductor 10 at its top as indicated in Fig. 4 where a protective cap 23 houses and supports the current transformer and rests on the top of the tube 20; or the current transformer may be supported by the conductor 10 independently of the tube 20 as indicated in Fig. 5.

In Fig. 6, I have indicated a capacitance coupling for energizing the radiant energy device instead of using a current transformer. This scheme may be used where a voltage measurement or response is desired and will take the place of the usual high-voltage potential transformer installation. In this embodiment, the radiant energy device 24, represented as a lamp of the mercury vapor type, is energized by the charging current that flows from the high-voltage conductor to a metal radiant ring 25 which surrounds and is supported by the insulating light shield 20 between the line and ground. This ring is preferably circular in cross section to prevent corona discharges that might otherwise occur if sharp corners were present. The current flow in this capacitance coupling will be proportional to the voltage between the conductor 10 and ground and, by providing a suitable cell that responds to the radiant energy given off by the mercury vapor lamp, a low voltage responsive measuring or control circuit may be had in the manner represented in Figs. 1 and 2.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus for obtaining a measurement in response to the alternating current flowing in a high-voltage conductor comprising, a current transformer, the primary of which comprises such high voltage conductor and having a core and secondary winding connected to said high-voltage conductor to prevent corona discharges, an electric lamp energized from the secondary winding of said transformer and producing light rays in proportion to the primary current of said transformer, a light-sensitive cell spaced a safe distance from said lamp and transformer with respect to the high voltage to which the latter are exposed, means for directing light rays from said lamp to said cell, means for excluding other light rays from said cell, an adjustable screen in the path of the light rays directed on said cell, and a direct-current measuring circuit supplied by said cell in proportion to the alternating current flowing in said high-voltage conductor.

2. Apparatus for producing a low voltage direct current in response to the flow of alternating current in a high-voltage conductor comprising, a current transformer having a core, a secondary winding, and a primary winding, the latter comprising the aforesaid high-voltage conductor, an electrical connection between the three named elements of said transformer, radiant energy producing means connected to be energized from the secondary of said transformer so as to produce radiant energy in response to the flow of alternating current in said high-voltage conductor, and a low-voltage circuit including a device which is exposed and is responsive to radiant energy produced by said means to cause a flow of direct current in said circuit when radiant energy is produced by said means, the low-voltage circuit and the elements which are exposed to the high potential of said conductor being spaced apart a sufficient distance to adequately insulate the low-voltage circuit with respect to such high potential.

3. In combination, a high-voltage conductor, a low-voltage circuit, and means for producing a current flow in the low-voltage circuit in proportion to alternating current flowing in the high-voltage conductor comprising a current transformer having said high-voltage conductor as its primary winding, a core and secondary winding for said transformer electrically connected to said high-voltage conductor, an electric lamp of the filament type energized from the secondary winding of said transformer, a resistor connected in parallel with said lamp, said resistor having the characteristic of decreasing its resistance with an increase in voltage across its terminals and vice versa and being so proportioned with respect to the resistance characteristics of the lamp as to cause the lamp to emit light rays in direct proportion to the current flowing in the primary of said transformer over a considerable range of current, said transformer being proportioned to become saturated near the full load current in said conductor when the lamp is near its maximum safe brilliancy, a light-responsive current-producing cell insulated from the high-voltage transformer and associated apparatus by being sufficiently spaced therefrom, means for directing light rays from said lamp to said cell, means for preventing other light rays from influencing said cell, and a measuring instrument supplied from said cell, calibrated to produce an indication of the current flow in said high-voltage conductor.

4. Apparatus for producing a current in response to the alternating current flowing in a high-voltage alternating-current conductor comprising, a current transformer having such a high-voltage conductor as its primary, a secondary winding for said transformer, a gas discharge lamp connected to be energized from the secondary of said transformer, a resistance which decreases with a rise in voltage across its terminals connected in parallel with said lamp, said elements being so related as to cause a discharge of said lamp only after the current in said high-voltage conductor exceeds a predetermined value, and a low-voltage circuit containing a light-sensitive cell, which cell is exposed to and responds to light rays given off by said lamp when the latter discharges causing a flow of current in said low-voltage circuit.

5. In combination with a high-voltage alternating-current conductor, a current transformer and an electric lamp energized through said transformer in response to current flowing in said conductor, said parts being associated with and exposed to the high voltage of said conductor, a tubular opaque insulator supporting the current transformer and lamp at one end, a light-sensitive current-producing cell positioned in the opposite end of said tube, said tube being closed at both ends to exclude dust and external light, a reflector for the lamp directing its rays through the tube on to said cell, and a low-voltage grounded circuit supplied by current from said cell in response to the flow of alternating current in said high-voltage conductor.

WILLIAM K. RANKIN.